A. MACRAE.
MIXER FOR MIXING SPRAYING SOLUTIONS.
APPLICATION FILED OCT. 16, 1909.
968,582. Patented Aug. 30, 1910.
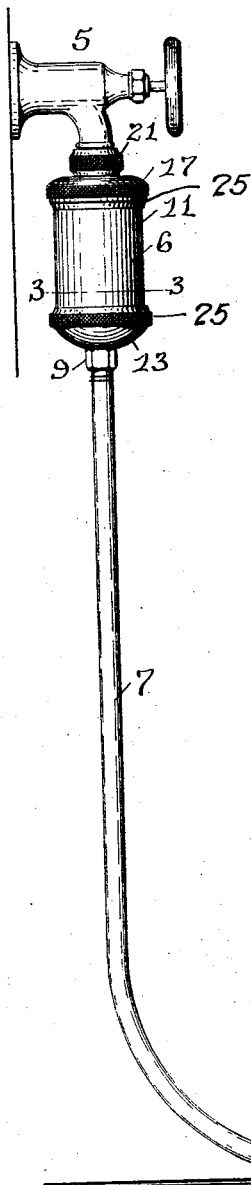
Fig. 1.
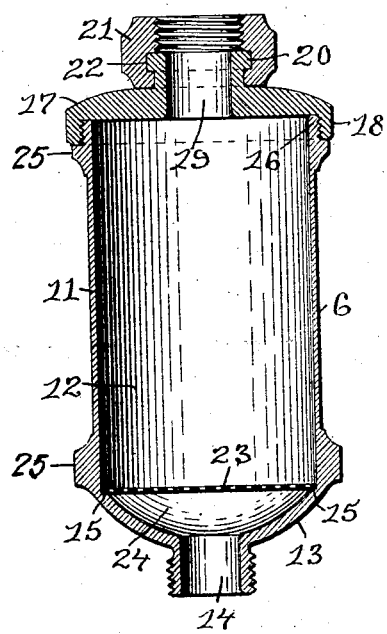
Fig. 2.
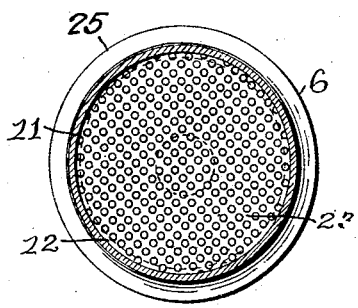
Fig. 3.
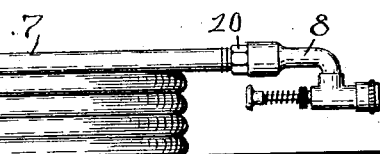
WITNESSES: INVENTOR:
Alexander Macrae
Charles H. Luther
ATTORNEY.
THE NORRIS PETERS CO., WASHINGTON, D. C.

UNITED STATES PATENT OFFICE.

ALEXANDER MACRAE, OF PROVIDENCE, RHODE ISLAND.

MIXER FOR MIXING SPRAYING SOLUTIONS.

968,582.  Specification of Letters Patent.  Patented Aug. 30, 1910.

Application filed October 16, 1909. Serial No. 523,000.

*To all whom it may concern:*

Be it known that I, ALEXANDER MACRAE, a citizen of the United States, residing at Providence, in the county of Providence and State of Rhode Island, have invented a new and useful Improvement in Mixers for Mixing Spraying Solutions, of which the following is a specification.

This invention has reference to an improvement in spraying apparatuses and more particularly to an improvement in mixers for mixing insecticide spraying solutions.

In the use of spraying apparatuses as heretofore constructed, the solution or emulsion is usually mixed separately and placed in the apparatus, said apparatus having hand or mechanical means for forcing the solution out of the apparatus under pressure. The solution or emulsion as generally used requires agitating from time to time by hand, and the best form of apparatus is expensive and too large or cumbersome for use in greenhouses.

The object of my invention is to improve the construction of a mixer, whereby an insecticide spraying solution is automatically mixed, by filling the mixer with an insecticide and flowing water under pressure through the mixer.

Final objects of my invention are to simplify the operation and reduce the cost of spraying plants in greenhouses or outside plants or shrubbery adjacent to a water supply under pressure, with an insecticide spraying solution.

My invention consists in the peculiar and novel construction of an insecticide mixer for mixing an insecticide spraying solution, as will be more fully set forth hereinafter and claimed.

Figure 1. is a side view of a spraying apparatus provided with my improved mixer. Fig. 2. is an enlarged vertical sectional view through the mixer, and Fig. 3. is an enlarged transverse sectional view through the mixer taken on line 3. 3. of Fig. 1.

In the drawings 5. indicates a sill cock, 6. my improved mixer, 7. a hose and 8. a spraying nozzle. The sill cock 5. is connected to a source of water supply under pressure (not shown); the hose 7. is detachably secured to the mixer 6. by a coupling 9. and the spraying nozzle 8., which is well known as the Vermorel form of spraying nozzle, is secured to the end of the hose 7. by a coupling 10. as shown in Fig. 1.

My improved mixer 6. consists of a hollow cylindrical body 11. having a large insecticide chamber 12, a rounded bottom 13., a central externally screw-threaded outlet 14. extending downward from the bottom, to which the coupling 9. of the hose 7 is secured, an internal annular lip 15, in the bottom 13. and an open externally screw-threaded top 16. A cover 17 having the externally screw-threaded annular lip 18 adapted to screw over the open screw-threaded end 16. of the body 11. and the inlet neck 19. having the external annular lip 20, an internally screw-threaded coupling 21. having the internal annular groove 22. by which the coupling is rotatably secured to the annular lip 20. on the neck 19., and a perforated disk 23. adapted to fit on the internal annular lip 15. in the bottom 13. and, form a mixing chamber 24. in the bottom, as shown in Fig. 3. The body 11. also has the annular strengthening ribs 25. 25. on the outside at the top and bottom for strengthening the body.

The operation of the mixer consists of filling the chamber 12 with an insecticide, such as whale oil soap cut in small pieces, screwing on the top 17., securing the mixer to the sill cock 5. by the coupling 21. and securing the hose 7. to the outlet 14. of the mixer by the coupling 9. Water under pressure is now turned on by opening the sill cock 5. The water rushes through the inlet neck 19., the insecticide chamber 12., the perforated plate 23., the mixing chamber 24. and the outlet 14. into the hose 7. In passing through the insecticide chamber 12. the water dissolves a predetermined amount of the insecticide, which is mixed with the water in passing through the perforated plate 23. which holds the insecticide in the chamber 12. The outer portion of the volume of water is retarded by the bottom 13. which forces this portion of the water back against the perforated plate 23, and into the central portion of the water, thereby thoroughly agitating and mixing the solution in the mixing chamber 24., before the solution passes through the hose 7. and nozzle 8. which controls the spraying of the solution in the usual way.

By the use of my improved mixer, plants and shrubbery, particularly in green-houses, can be sprayed more advantageously and economically than has heretofore been done.

Having thus described my invention I claim as new and desire to secure by Letters Patent:—

An insecticide mixer consisting of a hollow cast cylindrical body having comparatively thin sides, a large insecticide chamber, a rounded bottom concaved on its inner face, a central reduced externally screw-threaded outlet from the bottom, adapted for securing the mixer to the inlet end of a flexible hose, an internally annular lip in the body at the bottom of the insecticide chamber, an open externally screw-threaded top, and annular strengthening ribs on the outside at the top and bottom of the body, all formed integral, a cover having an internally screw-threaded annular lip adapted to screw over the open screw-threaded top of the body and a reduced central inlet neck having an inlet opening and an external annular lip, all formed integral, an internally screw-threaded rotatable coupling having an internal annular groove by which the coupling is rotatably secured to the annular lip on the neck, said rotatable coupling being adapted for detachably securing the mixer to a sill-cock or the like, a flat perforated disk supported on the internal annular lip in the body of the mixer, a shallow mixing chamber in the bottom of the body below the perforated disk being formed by the concaved inner face of the bottom and the flat underside of the perforated disk.

In testimony whereof, I have signed my name to this specification in the presence of two subscribing witnesses.

ALEXANDER MACRAE.

Witnesses:
   JULIA RICCI,
   ANTHONY V. PETTINE.